United States Patent [19]
Kalkunte et al.

[11] Patent Number: 6,115,356
[45] Date of Patent: Sep. 5, 2000

[54] APPARATUS AND METHOD FOR GENERATING FLOW CONTROL FRAMES IN A WORKGROUP SWITCH BASED ON TRAFFIC CONTRIBUTION FROM A NETWORK SWITCH PORT

[75] Inventors: Mohan V. Kalkunte, Sunnyvale; Jayant Kadambi, Milpitas, both of Calif.

[73] Assignee: Advanced Micro Devices, Inc., Sunnyvale, Calif.

[21] Appl. No.: 08/992,840

[22] Filed: Dec. 18, 1997

[51] Int. Cl.[7] ............................. G01R 31/08; H04L 12/26
[52] U.S. Cl. ........................... 370/229; 370/235; 370/413
[58] Field of Search ..................................... 370/229, 235, 370/412, 413, 428, 429

[56] References Cited

U.S. PATENT DOCUMENTS

| | | | |
|---|---|---|---|
| 5,768,258 | 6/1998 | Van As et al. ........................... | 370/236 |
| 6,031,821 | 2/2000 | Kalkunte et al. ........................ | 370/235 |
| 6,035,333 | 3/2000 | Jeffries et al. ........................... | 370/445 |
| 6,052,376 | 4/2000 | Wills ........................................ | 370/235 |

*Primary Examiner*—Chi H. Pham
*Assistant Examiner*—Maikhanh Tran

[57] ABSTRACT

A network switch in a full-duplex IEEE 802.3 network includes a data monitor module that monitors data utilization between ports. Upon detection of a congestion condition in an output buffer, the data monitor module determines for each of the remaining network switch ports a traffic contribution relative to the total network traffic received by the one congested network switch port. The network switch includes a pause controller that generates pause control frames for the remaining network switch ports, where each pause control frame specifies a corresponding interval having a duration based on the traffic contribution by the corresponding network node. The outputting of a pause control frame to a network node based on the corresponding traffic contribution optimizes elimination of the congestion condition by prioritizing the generation of pause frames for the network node most responsible for creating the congestion condition. In addition, disruption of traffic is minimized in stations having little or no traffic contribution to the congested network switch port.

18 Claims, 3 Drawing Sheets

APPARATUS AND METHOD FOR GENERATING FLOW CONTROL FRAMES IN A WORKGROUP SWITCH BASED ON TRAFFIC CONTRIBUTION FROM A NETWORK SWITCH PORT

BACKGROUND OF THE INVENTION

1. Technical Field

The present invention relates to network switching and more particularly, to methods and systems controlling network data traffic on full-duplex media in switched networks.

2. Background Art

Switched local area networks use a network switch for supplying data frames between network nodes such as network stations, routers, etc., where each network node is connected to the network switch by a media. The switched local area network architecture uses a media access control (MAC) layer enabling a network interface to access the media. The network switch passes data frames received from a transmitting node to a destination node based on the header information in the received data frame.

A network switch such as a workgroup switch typically includes port buffering at both input and output buffers. Specifically, a non-blocking switch typically includes ports having input buffers and output buffers such as first in first out (FIFO) buffers, that are sized to accommodate the transfer of data between a source and destination port at wire speed. However, congestion of an output buffer may occur if multiple data packets from multiple input buffers are directed to a single output buffer. Hence, an output buffer may be unable to keep up with reception of data packets from multiple input buffers within the switch.

Flow control has been proposed to reduce network congestion, where a transmitting node temporarily suspends transmission of data packets. A proposed flow control arrangement for a full-duplex environment, referred to as IEEE 802.3x[2] specifies generation of a flow control message, for example a PAUSE frame. A transmitting station that receives the PAUSE frame enters a pause state in which no data frames are sent on the network for a time interval specified in the PAUSE frame. However, control frames can be sent during the pause state.

If flow control is implemented in a switch, however, the transmission of data packets from the respective network nodes is effectively halted until the output congestion eases. One problem associated with implementing flow control in full-duplex links is head of line (HOL) blocking, where a transmitting node sending data packets to the workgroup switch may be forced into a pause interval, even though the transmitting node is attempting to send data packets to a destination node via a network switch port other than the congested network switch port. In addition, outputting flow control PAUSE frames to all the network nodes may unnecessarily reduce network traffic while the congested output buffer is outputting the data frames. Hence, the conventional policy for generation of PAUSE control frames may substantially reduce the throughput of the network unnecessarily.

SUMMARY OF THE INVENTION

There is a need for an arrangement in a network switch for selectively generating a pause control frame from a network switch port to a corresponding network node, where the pause control frame specifies a pause interval having a duration based upon the traffic contribution by the network node relative to the total network traffic received by a congested network switch port.

There is also a need for an arrangement that controls congestion in a transmit buffer of a network switch port, where a pause control frame is selectively output from one of the remaining network switch ports based on a corresponding network node providing the maximum traffic contribution relative to the total network traffic received by the congested network switch port.

There is also a need for an arrangement in a network switch for controlling a detected congestion condition in a transmit buffer of one of the network switch ports, where head of line blocking is minimized in network nodes transmitting data packets to network switch ports other than the congested network switch port.

These and other needs are attained by the present invention, where a network switch outputs a pause control frame to at least one network node to eliminate a congestion condition detected in a transmit buffer in one of the network switch ports, where the pause control frame specifies a pause interval based on the corresponding traffic contribution by the one network node.

According to one aspect of the present invention, a method in a network switch having network switch ports comprises detecting a congestion condition in a transmit buffer of one of the network switch ports, determining for each remaining network switch port a traffic contribution relative to a total network traffic received by the one congested network switch port, and outputting from at least one of the remaining network switch ports, to a corresponding network node, a first pause control frame specifying a first pause interval having a duration based on the corresponding traffic contribution. Outputting the pause control frame to at least one of the remaining network switch ports based on the corresponding traffic contribution optimizes elimination of the congestion condition in the transmit buffer by prioritizing the generation of the pause control frame for the network node most responsible for creating the congestion condition. Moreover, the generation of a pause control frame specifying a pause interval duration based on the corresponding traffic contribution ensures that the pause interval is minimized in stations having little or no traffic contribution to the congested network switch port.

Another aspect of the present invention provides a network switch comprising network switch ports for sending and receiving data packets between respective network nodes, each network switch port comprising an input buffer for receiving a received data packet from a corresponding network node and an output buffer for transmitting a switched data packet to the corresponding network node, a first monitor configured for detecting a congestion condition in the output buffer of one of the network switch ports, a data traffic monitor configured for determining a traffic contribution, relative to a total network traffic received by the one congested network switch port, for each of the remaining network switch ports, and a controller for generating a pause control frame, the pause control frame output from the output buffer of at least one of the remaining network switch ports and specifying a pause interval having a duration based on the corresponding traffic contribution. The data traffic monitor is able to determine the flow of data traffic between the input buffers and output buffers of the network switch, enabling the network switch to identify which input buffer (and corresponding network node) is most responsible for creating a congestion condition in a network switch output buffer. In addition, generation of the pause control frame by the controller based on the traffic contributions detected by the data traffic monitor ensures that the congestion condition is efficiently eliminated by generating a pause frame to the network node most responsible for the congestion condition, while minimizing the pause intervals in other network nodes providing little or no contribution to the detected congestion condition.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
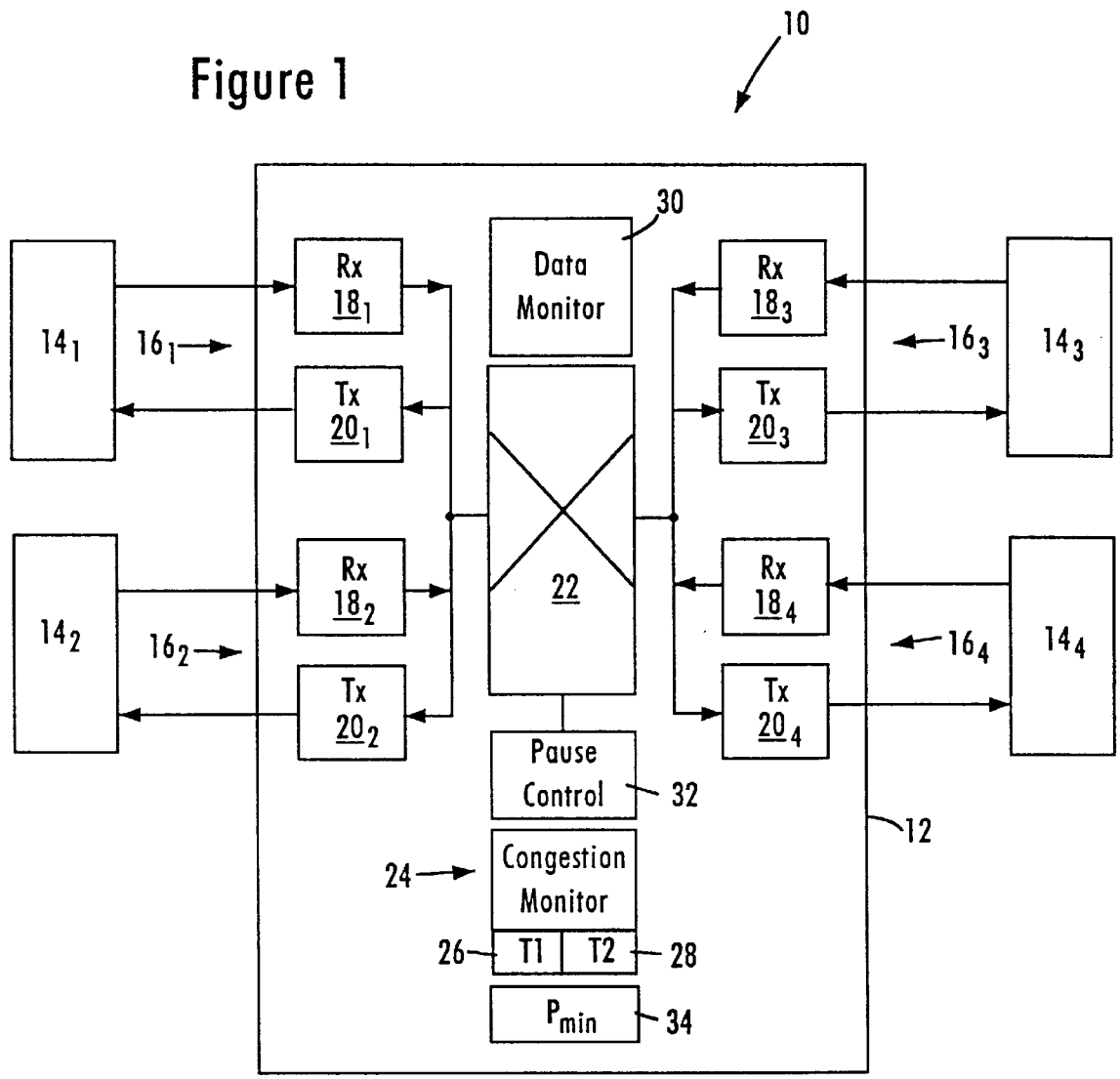
FIG. 1 is a block diagram of the network switch for selectively generating pause control frames according to an embodiment of the present invention.

FIG. 1 is a block diagram of a packet switched network 10, such as an Ethernet (ANSI/IEEE 802.3) network. The packet switched network 10 includes a multiple port switch 12 that enables communication of data packets between network nodes 14. According to the disclosed embodiment, the network switch 12 includes network switch ports 16 including an input buffer 18 having a receive buffer for receiving a received data packet from a corresponding network node 14. Each network switch port 16 also includes an output buffer 20 for transmitting a switched data packet to the corresponding network node 14. The network switch 12 also includes switching logic 22, also referred to as a switch fabric for selectively switching a received data packet from an input buffer 18 to a specific output buffer 20 based on address information in the received data frame, and switching logic that makes switching decisions based on the detected address information.

The network switch ports 16 and the network nodes 14 preferably operate in full-duplex mode according to the proposed Ethernet standard IEEE 802.3x Full-Duplex with Flow Control—Working Draft (0.3). The full-duplex environment provides a two-way, point to point communication link between each network node 14 and the multiple port switch 12, where the multiple port switch 12 and the respective nodes 14 can simultaneously transmit and receive data packets at 100 Mb/s or Gigabit rates without collisions. The network nodes 14 may be implemented as workstations, servers, or routers for connection to other networks.

The switching logic 22 determines which output buffers 20 should transmit a data packet received by one of the input buffers 18 based on internal switching logic. The switching logic 22 may output a given data packet received by an input buffer 18 to either a single port, multiple ports, or all ports (i.e., broadcast). For example, each data packet includes a header having a source and destination address, where the switching logic 22 may identify the appropriate output buffer 20 based upon the destination address. Alternatively, the destination address may correspond to a virtual address that the switching logic 22 identifies as corresponding to a plurality of network nodes 14. Alternatively, the received data packet may include a virtual LAN (VLAN) tagged frame according to IEEE 801d protocol that specifies another network (via a router at one of the 100 Mb/s nodes 14) or a prescribed group of workstations.

The network switch 12 also includes a congestion monitor 24 configured for detecting a congestion condition in one of the output buffers 20. Specifically, the congestion monitor 24 includes programmable registers 26 and 28 for storing a first threshold (T1) and a second threshold (T2), respectively. As described in detail below, a congestion condition is detected in a transmit buffer 20 of one of the network switch ports 16 if the stored number of bytes in the corresponding transmit buffer is detected as exceeding one of the thresholds T1 and T2, where T1 is less than T2.

As described above, one problem with employing flow control in full-duplex links is head of line blocking. Since one input buffer may include data packets to be directed by the switching logic 22 to different output buffers 20, issuing a PAUSE frame having a substantially long pause interval to a network node 14 may result in traffic starvation on other output buffers 20.

According to the disclosed embodiment, a PAUSE frame is sent to at least one network node $14_i$ that specifies a pause interval having a duration based on the corresponding traffic contribution by that network node $14_i$ in creating the congestion condition. For example, assume that the network switch 12 is a non-blocking switch, where data packets are switched between ports 16 at wire speed (e.g., 100 Mb/s). Assume that the congestion monitor 24 detects a congestion condition in the transmit buffer $20_4$, where the stored number of bytes in the transmit buffer for output buffer $20_4$ exceeds the lower threshold T1. The output buffer $20_4$ may be congested, for example, by input buffers $18_1$, $18_2$, and $18_3$ transmitting packet data to the output buffer $20_4$. Upon detecting the congestion condition in the output buffer $20_4$, the network switch 12 outputs PAUSE frames from the remaining network switch ports having created the congestion condition (i.e., ports $16_1$, $16_2$, and $16_3$) with a pause time that is proportional to the traffic flow between the ports.

Specifically, the network switch 12 includes a data traffic monitor 30 configured for monitoring network traffic throughout the switch 12, including the routing of a received data packet from a given input buffer $18_i$ to at least one output buffer $20_i$. The data monitor 30 monitors the network traffic through the switching logic 22, for example, by receiving management information base (MIB) objects from the switching logic 22 for each data packet routed through the switching logic 22. As such, the data monitor 30 monitors for each output buffer 20 the total network traffic received by that output buffer 20, as well as the relative contribution by each input buffer 18 to the total network traffic received by the one network switch port 20.

Figure 2:
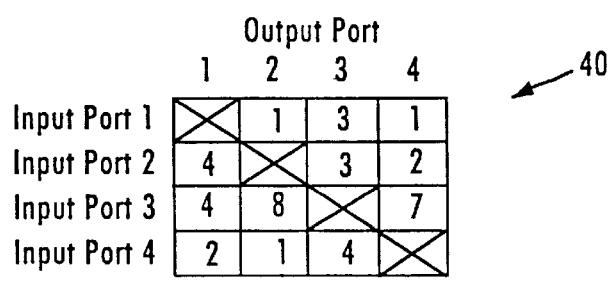
FIG. 2 is a block diagram illustrating the memory in the data traffic monitor for tracking network traffic on a port by port basis.

FIG. 2 is a diagram illustrating a memory 40 in the data monitor 30 for storing packet data traffic information based on data packets switched by the switching logic 22. As shown in FIG. 2, the memory 40 is configured as a matrix, referred to as a Traffic Table, that stores for each output buffer 20 the contributions from the input buffers relative to the corresponding received network traffic. For example, the output buffer $20_1$ corresponding to column 1, receives forty percent (40%) of the total traffic from input buffer $18_2$, forty percent (40%) from input buffer $18_3$, and twenty percent (20%) from input buffer $20_4$. Hence, input buffer $18_2$ provides a 40% traffic contribution to output buffer $20_1$, input buffer $18_3$ provides a 40% traffic contribution to output buffer $20_1$, and input buffer $18_4$ provides a 20% traffic contribution to the output buffer $18_1$. Hence, the data monitor 30 identifies, for each destination network switch port 20, the traffic contributions from the respective source ports 18 relative to the total network traffic received by the destination network switch port 20, and stores for each destination port 20 the identified traffic contributions for the source port in terms of percentage of total traffic. Hence, the data monitor module 30 can determine the relative traffic contribution by each input buffer 18 in causing a congestion condition in one of the output buffers 20. The traffic contributions stored in the memory 40 thus enable generation of pause frames having different durations based on the corresponding traffic contribution, as well as enabling a priority-based pause interval generation scheme, where a single PAUSE frame interval is sent to the network node providing the highest amount of traffic, or to all the remaining network nodes based on the relative traffic contribution, described below.

Figure 3A:
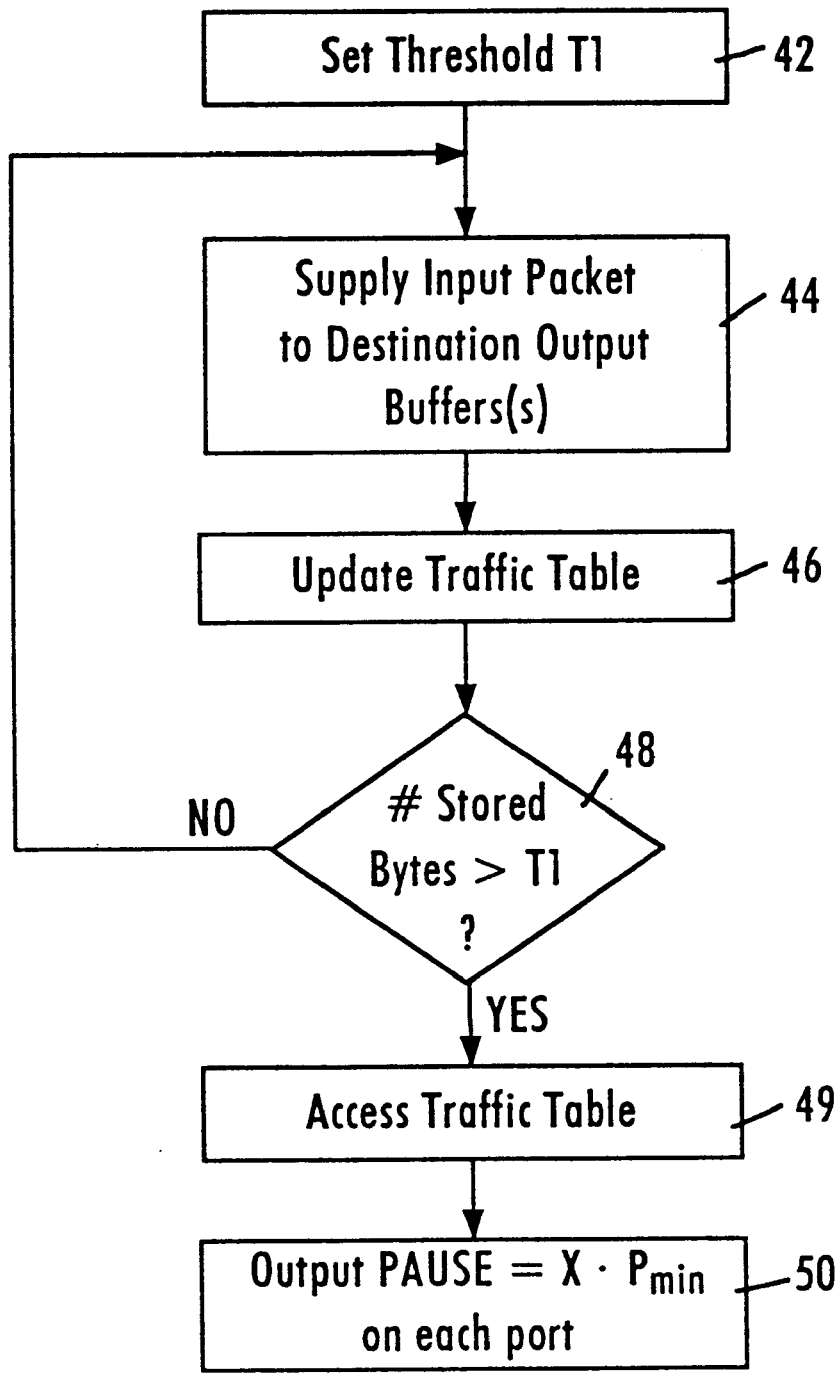
FIGS. 3A and 3B are flow diagrams illustrating methods for selectively generating pause control frames according to first and second embodiments of the present invention, respectively.
Figure 3B:
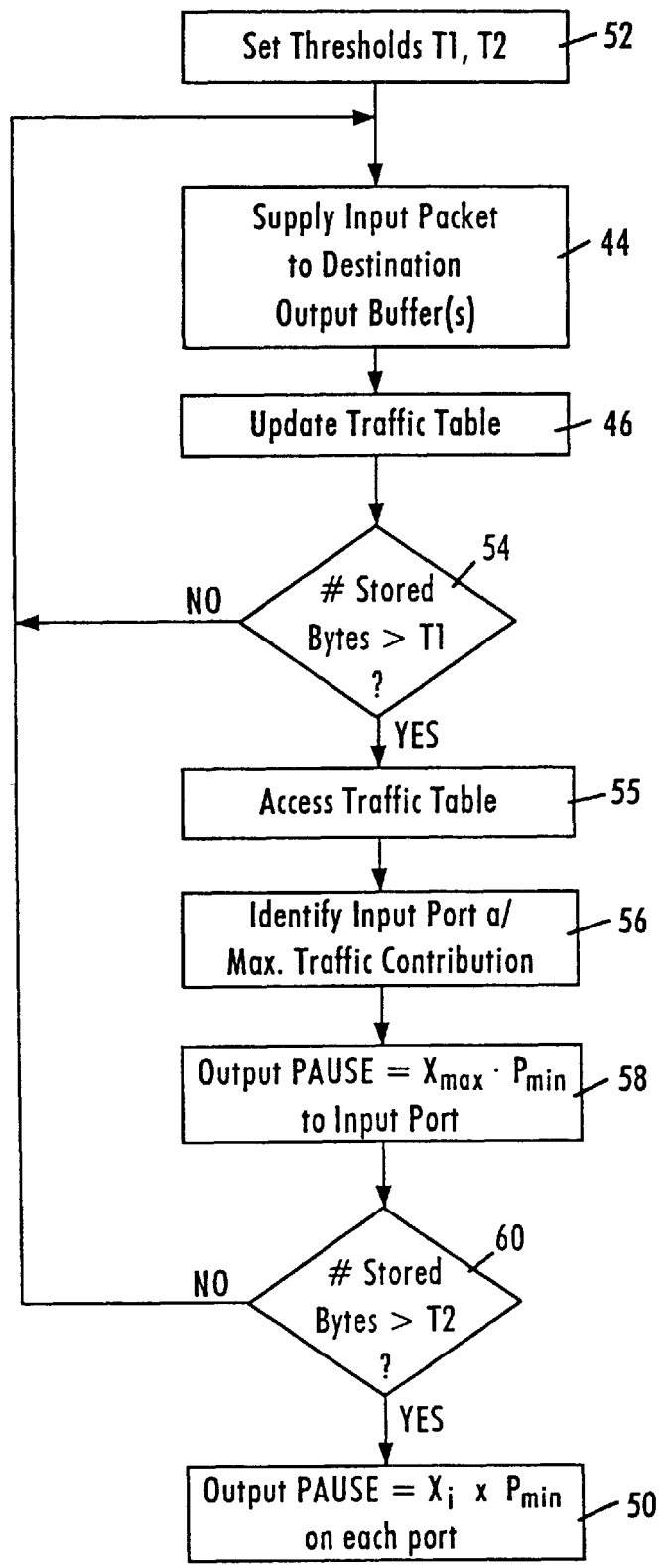

FIGS. 3A and 3B are flow diagrams illustrating alternative arrangements for controlling detected congestion conditions in the network switch 12 according to first and second embodiments of the present invention, respectively. FIG. 3A describes a method for controlling congestion detected in a network switch port, where the remaining network switch ports (i.e., the network switch ports supplying data to the congested network output buffer 20) output PAUSE control frames to the respective network nodes 14, each PAUSE control frame having a corresponding pause interval for the corresponding network node 14 based on the corresponding traffic contribution specified in the traffic table 40 of FIG. 2.

As shown in FIG. 3A, the method begins in step 42 by setting a threshold T1 in the programmable register 26 in step 42. The data monitor 30 then begins to monitor traffic contributions in step 44 by monitoring the routing of data packets via the switching logic 22. Specifically, the switching logic 44 supplies an input packet from an input buffer $18_i$ to at least one destination output buffer in step 44. The data monitor 30 then updates the traffic table 40 in step 46 by populating the tables for each output buffer following supplying the input packet in step 44.

The congestion monitor 24 monitors the stored number of bytes in each of the transmit buffers $20_i$, and detects if the stored number of bytes in each transmit buffer $20_i$ exceeds the congestion threshold T1 in step 48. The congestion monitor 24 may check each destination output buffer $20_i$ after each switched packet (e.g., on a per-packet basis), or alternatively operate as a state machine that continuously monitors the output buffer $20_i$. If none of the transmit buffers for the output buffer $20_i$ have a stored number of data bytes greater than the threshold T1, then no congestion condition is present. As shown in FIG. 3A, the data monitor 30 continues to monitor the data traffic, and updates the identified traffic contributions, each time a packet is switched (i.e., supplied) to an output buffer, for the respective source ports for each destination port based on the network traffic.

If in step 48 the congestion monitor 24 determines that the stored number of bytes in one of the transmit buffers (e.g., transmit buffer $20_4$) exceeds the prescribed T1 threshold, the pause control 32 generates a PAUSE control frame for each remaining output buffer by determining the pause interval for each of the remaining network switch ports based on the corresponding traffic contribution. Specifically, the pause control 32 accesses the traffic table 40 in step 49 to determine the corresponding traffic contribution, and outputs to each of the remaining network nodes 14 in step 50 the corresponding PAUSE control frame specifying the corresponding pause interval.

For example, assuming that the congestion monitor 24 detected the output buffer $20_4$ as having a congestion condition, the pause controller 32 would access column 4 of the traffic table 40 to determine the respective traffic contributions 10%, 20%, and 70% for the input buffers $18_1$, $18_2$, and $18_3$, respectively. The pause controller 32 then generates a PAUSE control frame for each corresponding network node $14_1$, $14_2$, and $14_3$, where the pause interval for node $14_1$ is $PAUSE_1=1*P_{min}$, where $P_{min}$ equals the minimum pause interval. According to the disclosed embodiment, the minimum pause interval is one slot time, although alternative minimum pause intervals may be used, and the maximum pause interval is 64 K slot times. Similarly, $PAUSE_2=2*P_{min}$, and $PAUSE_3=7*P_{min}$. Upon calculating the pause durations, the PAUSE control frames carrying the pause intervals $PAUSE_1$, $PAUSE_2$, and $PAUSE_3$ are output via the output buffers to nodes $14_1$, $14_2$, and $14_3$, respectively. Hence, node $14_3$ receives a PAUSE frame specifying a pause interval having the largest duration of $7*P_{min}$, since the traffic table 40 specifies that the node $14_3$ supplies input buffer $18_3$ with 70% of the traffic encountered by the output buffer $20_4$.

FIG. 3B is a block diagram illustrating an alternative method for controlling congestion, where thresholds T1 and T2 are used to selectively output PAUSE control frames prioritized on the basis of the maximum traffic contribution.

The method of FIG. 3B begins in step 52, where the thresholds T1 and T2 are set in programmable registers 26 and 28, respectively. The thresholds T1 and T2 may have threshold values, for example, of 50% and 75% of buffer capacity, respectively. The data monitor 30 then begins to monitor traffic and update the traffic table 40 in steps 44 and 46, respectively. The congestion monitor 24 monitors the buffer capacity of each of the output buffers $20_i$ to determine a first-level congestion condition where the stored number of bytes is greater than the first threshold T1 in step 54. As described above, the congestion monitor 24 may independently monitor the congestion conditions.

Assuming the output buffer $20_4$ has a number of bytes greater than the first threshold T1, the pause controller 32 identifies the input buffer $18_i$ with the maximum traffic contribution by accessing the column of the traffic table 40 corresponding to the congested output buffer $20_4$ in step 55. The pause controller 32 identifies in step 56 the input buffer $18_3$ as having the maximum traffic contribution (70%) for the output buffer $20_4$, and outputs a PAUSE frame via the output buffer $20_3$ to the network node 143, where the PAUSE control frame specifies a pause interval of $X_{max}*P_{min}$, where $X_{max}=7$ (step 58). The congestion monitor 24 checks in step 60 whether the stored number of bytes in the output buffer $20_i$ is greater than the second threshold T2. If the stored number of bytes is less than T2, then normal operations are resumed in step 44.

Hence, the arrangement of FIG. 3B enables prioritized generation of a PAUSE control frame, where a first PAUSE control frame is sent to the identified network switch port having the maximum traffic contribution in causing the detected congestion condition. Hence, the unnecessary generation of PAUSE frames to other network nodes having a minimal contribution to the congestion condition is avoided.

If in step 60 the stored number of bytes in the congested output buffer $20_i$ is greater than the higher threshold T2, then the pause controller 32 outputs to each of the remaining network switch ports (e.g., $20_1$, $20_2$, and $20_3$) a corresponding PAUSE frame to control the congestion of the congested network switch port $20_4$, as described above in FIG. 3A with respect to step 50.

According to the disclosed embodiment, a data monitor module within the network switch monitors the data utilization between ports to provide efficient generation of PAUSE frames without unnecessarily reducing network activity from network nodes that do not provide a substantial contribution to a congestion condition. Rather, a PAUSE control frame is output to at least one network node from a corresponding network switch port, where the PAUSE control frame specifies a pause interval having a duration based on the traffic contribution by the corresponding network node in creating the congestion condition.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network switch having network switch ports, the method comprising:

detecting a congestion condition in a transmit buffer of one of the network switch ports;

determining for each remaining network switch port a traffic contribution relative to a total network traffic received by the one congested network switch port; and outputting from at least one of the remaining network switch ports, to a corresponding network node, a first pause control frame specifying a first pause interval having a duration based on the corresponding traffic contribution.

2. The method of claim 1, wherein the detecting step comprises:

setting a transmit buffer threshold for each of the network switch ports; and detecting a stored number of bytes in the transmit buffer for the one congested network switch port exceeding the transmit buffer threshold.

3. The method of claim 1, wherein the detecting step comprises:

setting first and second transmit buffer thresholds for each of the network switch ports, the first transmit buffer threshold less than the second transmit buffer threshold;

detecting a stored number of bytes in a transmit buffer for the one congested network switch port exceeding at least the first transmit buffer threshold.

4. The method of claim 3, wherein the outputting step comprises:

identifying one of the remaining network switch ports as having the maximum traffic contribution; and outputting the first pause control frame from the identified one network switch port having the maximum traffic contribution as said at least one remaining network switch port.

5. The method of claim 4, further comprising:

detecting the stored number bytes in the transmit buffer for the one congested network switch port exceeding the second transmit buffer threshold; and outputting from at least the identified one network switch port a second pause control frame based on the corresponding traffic contribution.

6. The method of claim 5, wherein the second pause control frame outputting step comprises:

outputting the second pause control frame specifying at least the first pause interval duration to the identified one network switch port; and outputting from a second one of the remaining network switch ports a third pause control frame specifying a third pause interval having a duration based on the corresponding traffic contribution.

7. The method of claim 1, wherein the outputting step comprises:

determining the first pause interval for each of the remaining network switch ports based on the corresponding traffic contribution; and outputting to each of the remaining network nodes the corresponding first pause control frame specifying the corresponding first pause interval.

8. The method of claim 7, further comprising:

detecting an increased congestion condition in the one congested network switch port following outputting the first pause control frames from the respective remaining network switch ports; and outputting a second plurality of pause control frames from the respective remaining network switch ports specifying pause intervals based on the respective traffic contributions.

9. The method of claim 1, wherein the determining step comprises:

identifying, for each destination network switch port, the traffic contributions from respective source ports relative to the total network traffic received by said each destination network switch port; and storing for each destination port the identified traffic contributions for the respective source ports.

10. The method of claim 9, wherein the determining step further comprises accessing the stored identified traffic contributions for the one congested network switch port.

11. The method of claim 9, wherein the determining step further comprises periodically updating the identified traffic contributions for the respective source ports for said each destination port based on detected network traffic.

12. A network switch comprising:

network switch ports for sending and receiving data packets between respective network nodes, each network switch port comprising an input buffer for receiving a received data packet from a corresponding network node and an output buffer for transmitting a switched data packet to the corresponding network node;

a first monitor configured for detecting a congestion condition in the output buffer of one of the network switch ports;

a data traffic monitor configured for determining a traffic contribution, relative to a total network traffic received by the one congested network switch port, for each of the remaining network switch ports; and a controller for generating a pause control frame, the pause control frame output from the output buffer of at least one of the remaining network switch ports and specifying a pause interval having a duration based on the corresponding traffic contribution.

13. The network switch of claim 12, wherein the data traffic monitor includes a memory configured for storing, for each output buffer, the traffic contributions from the respective input buffers relative to the corresponding received network traffic.

14. The network switch of claim 13, further comprising a second memory for storing a minimum pause interval, wherein the specified pause interval is a multiple number of the minimum pause intervals based on the corresponding traffic contribution.

15. The network switch of claim 13, further comprising a programmable register for storing a threshold value specifying a stored number of bytes corresponding to the congestion condition.

16. The network switch of claim 12, wherein the controller outputs corresponding pause control frames to each of the remaining network nodes, each pause control frame specifying a duration based on the corresponding traffic contribution.

17. The network switch of claim 12, wherein the controller generates the pause control frame to a selected one of the remaining network switch ports based on the selected one remaining network switch port having a corresponding maximum traffic contribution and in response to the first monitor detecting stored data in the output buffer of the congested one network switch port exceeding a first threshold value.

18. The network switch of claim 17, wherein the controller generates respective pause control frames to the respective remaining network switch ports in response to the first monitor detecting the stored data in the output buffer of the congested one network switch port exceeding a second threshold value greater than the first network value.

* * * * *